United States Patent
Suau et al.

(10) Patent No.: US 8,053,497 B2
(45) Date of Patent: Nov. 8, 2011

(54) POLYMERS PRODUCED BY USING SULPHUR COMPOUNDS IN THE FORM OF TRANSFER AGENTS FOR CONTROLLED RADICAL POLYMERISATION OF ACRYLIC ACID AND THE USE THEREOF

(75) Inventors: Jean-Marc Suau, Lucenay (FR); Christian Jacquemet, Lyons (FR)

(73) Assignee: Coatex S.A.S., Genay (FR)

( * ) Notice: Subject to any disclaimer, the term of this patent is extended or adjusted under 35 U.S.C. 154(b) by 0 days.

(21) Appl. No.: 12/909,661

(22) Filed: Oct. 21, 2010

(65) Prior Publication Data

US 2011/0033558 A1 Feb. 10, 2011

Related U.S. Application Data

(62) Division of application No. 10/594,519, filed as application No. PCT/FR2005/000703 on Mar. 23, 2005, now Pat. No. 7,851,572.

(30) Foreign Application Priority Data

Jul. 28, 2004 (FR) ..................... 04 08307

(51) Int. Cl.
*C08L 33/14* (2006.01)
*C08L 43/02* (2006.01)
*C08L 53/00* (2006.01)
*C08K 3/26* (2006.01)
*C08K 3/30* (2006.01)
*C08K 3/34* (2006.01)
*C08F 2/00* (2006.01)
*C08F 20/00* (2006.01)
*C08F 118/02* (2006.01)

(52) U.S. Cl. ............ 524/3; 524/425; 524/447; 524/451; 524/533; 524/558; 526/213; 526/222; 526/317.1; 526/319; 526/303.1; 522/180; 522/184

(58) Field of Classification Search .............. 524/3, 425, 524/447, 451, 533, 555, 558, 547, 521; 526/213, 526/222, 317.1, 319, 303.1; 522/180, 184
See application file for complete search history.

(56) References Cited

U.S. PATENT DOCUMENTS

| | | | |
|---|---|---|---|
| 6,642,318 B1 * | 11/2003 | Chiefari et al. | 525/261 |
| 7,462,676 B2 * | 12/2008 | Suau et al. | 526/317.1 |
| 2004/0097674 A1 | 5/2004 | Suau et al. | |
| 2006/0111534 A1 | 5/2006 | Suau et al. | |

FOREIGN PATENT DOCUMENTS

| | | |
|---|---|---|
| DE | 217 214 | 1/1985 |
| WO | 01 60792 | 8/2001 |
| WO | 02 070571 | 9/2002 |
| WO | 03 055919 | 7/2003 |

OTHER PUBLICATIONS

Mayadunne, Roshan T. A. et al.,"Living Polymers by the Use of Trithiocarbonates as Reversible Addition-Fragmentation Chain Transfer (RAFT) Agents: ABA Triblock Copolymers by Radical Plymerization in Two Steps", Macromolecules 2000, vol. 33, No. 2, pp. 243-245, 2000.

Lai, John T. et al.,"Functional Polymers from Novel Carboxyl-Terminated Trithiocarbonates as Highly Efficient RAFT Agents", Macromolecules 2002, vol. 35, No. 18, pp. 6754-6756, 2002.

International Search Report mailed Jul. 11, 2005, in PCT/FR2005/000703, filed Mar. 23, 2005.

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

The invention concerns the polymers obtained by the use of sulfur compounds in a process for controlled radical polymerization in water of acrylic acid and/or acrylic acid with hydrosoluble monomers. It concerns also their uses as dispersant agents or agents to aid grinding and/or co-grinding of mineral matters in aqueous suspensions, and as dispersant agents incorporated directly in aqueous formulations containing mineral matters. Finally, the invention concerns the formulations of mineral matters obtained in this manner.

47 Claims, No Drawings

POLYMERS PRODUCED BY USING SULPHUR COMPOUNDS IN THE FORM OF TRANSFER AGENTS FOR CONTROLLED RADICAL POLYMERISATION OF ACRYLIC ACID AND THE USE THEREOF

CROSS REFERENCE TO RELATED APPLICATIONS

This application is a divisional application of U.S. application Ser. No. 10/594,519, filed Sep. 28, 2006, now allowed. This divisional application claims priority to U.S. application Ser. No. 10/594,519, filed Sep. 28, 2006, to International Application No. PCT/FR05/00703, filed Mar. 23, 2005, and to French Application No. 0408307, filed on Jul. 28, 2004. The contents of each of these applications are incorporated by reference herein, in their enterities.

The invention concerns homopolymers of acrylic acid and/or of copolymers of acrylic acid with other hydrosoluble monomers obtained by a process of controlled radical polymerisation of the RAFT type in water of homopolymers of acrylic acid and/or copolymers of acrylic acid with other hydrosoluble monomers, using as a transfer agent compounds of formula (I'):

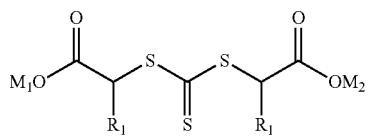

where $R_1$ designates an alkyl radical having 1 to 10 carbon atoms, a simple aromatic radical or one substituted by an alkyl chain having 1 to 4 carbon atoms;
and where $M_1$ and $M_2$ designate the hydrogen atom, an amine salt, ammonium or an alkaline cation, and are identical or different.

These homopolymers of acrylic acid and/or copolymers of acrylic acid with other hydrosoluble monomers are characterised in that they have a polymolecularity index of under 2.2 and contain at the end of the chain a pattern which is in accordance with formula (I):

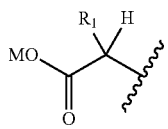

where $R_1$ designates an alkyl radical having 1 to 10 carbon atoms, an aromatic radical possibly substituted by an alkyl chain having 1 to 4 carbon atoms;
and where M designates the hydrogen atom, an amine salt, ammonium or an alkaline cation.

The MALDI TOF method enables the presence of the pattern of formula (I) at the end of the polymer chain according to the invention to be demonstrated. This method is a technique for time of flight analysis by mass spectrometry which is well known to the skilled man in the art ("Controlled radical polymerization of acrylic acid in protic media", Macromolecules, 2001, 34, 5370 and "Synthesis and characterization of poly(acrylic acid) produced by RAFT polymerization: application as a very efficient dispersant of CaCO3, kaolin, and TiO2", Macromolecules, 2003, 36, 3066).

The invention also concerns the use, as agents to aid grinding and/or co-grinding of mineral matter in water, of the said homopolymers of acrylic acid and/or of the said copolymers of acrylic acid with other hydrosoluble monomers.

The invention also concerns the use as agents for the dispersion of mineral matter in water, of the said homopolymers of acrylic acid and/or of the said copolymers of acrylic acid with other hydrosoluble monomers.

The invention also concerns aqueous suspensions of mineral matter ground and/or co-ground with the polymers according to the invention.

The invention also concerns aqueous dispersions of mineral matter dispersed with the polymers according to the invention.

The invention also concerns the use of the said aqueous dispersions and suspensions of mineral matter, in paper formulations, and notably in paper coating colours and mass fillings, in paint, plastic, cement and ceramic formulations, in formulations for the treatment of water, detergent and cosmetic formulations, and in drilling muds.

The Applicant wishes to specify here that every dispersant used in the treatment of water also has an anti-tartar function.

He also stipulates that the use of the said aqueous dispersions and suspensions in plastic formulations involves a stage of drying of the said dispersions and suspensions, a stage which is well known to the skilled man in the art.

The invention also concerns the direct use, as a dispersant agent, of homopolymers of acrylic acid and/or of copolymers of acrylic acid with other hydrosoluble monomers according to the invention, in paper formulations, and notably in paper coating colours and mass fillings, in paint, cement and ceramic formulations, in formulations for the treatment of water, in detergent and cosmetic formulations, and in drilling muds.

The invention also concerns the direct use, as a scale inhibitor agent, of homopolymers of acrylic acid and/or copolymers of acrylic acid with other water-soluble monomers according to the invention, in formulations for the treatment of water.

The invention also concerns paper formulations, and notably paper coating colours and mass fillings, paint, plastic, cement and ceramic formulations, formulations for the treatment of water, detergent and cosmetic formulations, and drilling muds, obtained through the use in the said formulations of the aqueous dispersions and suspensions of mineral matter according to the invention.

The invention also concerns formulations for the treatment of water, obtained by direct use of polymers according to the invention as a scale inhibitor agent.

Finally, the invention concerns paper formulations, and notably paper coating colours and mass fillings, paint, plastic, cement and ceramic formulations, formulations for the treatment of water, detergent and cosmetic formulations, and drilling muds, obtained through the direct use as a dispersant agent in the said formulations of the polymers according to the invention.

Homopolymers of acrylic acid, and copolymers of acrylic acid with hydrosoluble monomers, are now well known as products with multiple applications, notably in the field of aqueous suspensions and dispersions of mineral matter as dispersion agents or as grinding aid agents, but also as dispersant agents in the more general field of aqueous formulations such as, notably, those used in the paper field for the manufacture of paper coating colours or mass filling, or in the field of aqueous paints.

Obtaining such homopolymers and copolymers with a high conversion rate (notably over 90%) i.e. an optimum reaction yield, a low polymolecularity index (notably of under 2.2), a controlled molecular mass, i.e. the possibility for the manufacturer to obtain a molecular mass of their choice, is thus a matter of very great importance for the skilled man in the art.

To this end, it is common to use processes for controlled radical polymerisation (CRP: Controlled Radical Polymerization), whilst seeking to obtain the properties required for the homopolymers and copolymers thus obtained.

Among them, the first were ATRP (Atom Transfer Radical Polymerization) and NMP (Nitroxide Mediated Polymerization). It was nonetheless realised that they were not completely satisfactory. With ATRP, it was demonstrated in the document "Atom-transfer radical polymerization and the synthesis of polymeric materials" (Advanced Materials (1998), 10 (12), 901-915), that polymerisation of acrylic acid was difficult. Acrylic acid reacts rapidly with the catalyst, giving rise to compounds which did not enable the polymolecularity index of the final document to be controlled effectively (see page 910). However, document FR 2 797 633 proposes a method for polymerisation of acrylic and methacrylic monomers by this means. However, these documents give rise to new problems for the skilled man in the art. The ATRP process uses copper salt based catalysts which cause undesirable pollution; copper will be found again in the synthesised products, which the skilled man in the art does not necessarily desire.

In the case of NMP, other work has shown that the acid grouping was involved in related reactions with nitroxides, leading to reaction by-products, as described in the document "Rate Enhancement of Living Free-Radical Polymerizations by an Organic Acid Salt" (Macromolecules (1995), 28(24), 8453-8455). In addition, in the case of the synthesis of polyacrylic acid using this technique, it was shown that the rate of conversion did not follow the degree of polymerisation ("Direct synthesis of controlled poly(styrene-co-acrylic acid)s of various compositions by nitroxide-mediated random copolymerization", Macromol. Chem. Phys. (2003), 204, 2055-2063): It is thus difficult to use this method to control precisely the degree of polymerisation of the acrylic acid.

The skilled man in the art then turned to another technique of controlled radical polymerisation: RAFT (Reversible Addition Fragmentation Transfer).

Initially processes of the RAFT type using transfer agents manufactured in solvents and polymers also synthesised in the presence of solvents were developed.

One is thus familiar with document EP 0 910 587 which describes a process for the manufacture of compounds of the general formula Z(C=S)SR, used as a chain transfer agent in processes of the RAFT type, and which teaches that it is necessary to choose an appropriate solvent in accordance with the monomers which one wishes to polymerise, as is shown notably by example 22, using dimethylformamide for the synthesis of polyacrylic acid. In addition, the Applicant notes that the rate of conversion is particularly low, since it is equal to 17.5%.

This approach has continued to be studied, and the skilled man in the art also now has the document "Controlled polymerization of acrylic acid under $^{60}$Co irradiation in the presence of dibenzyl trithiocarbonate" (Journal of Polymer Science: Part A: Polymer Chemistry (2001), 39, 3934-3939). It describes the polymerisation of acrylic acid using the RAFT technique in the presence of dibenzyl trithiocarbonate, which is excited by irradiation at $^{60}$Co, and then diluted in dimethylformamide In addition, the dibenzyl trithiocarbonate is prepared in the presence of a solvent which must be evaporated at the end of the reaction.

This type of process has the double disadvantage of using organic solvents, both during the manufacture of the transfer agent, and in the polymerisation stage. In addition to the fact that they may be dangerous for the user and harmful for the environment, these solvents must be eliminated at the end of the reaction to purify the product by evaporation, distillation, or any other means familiar to the skilled man in the art: this makes the process longer and more costly. There is thus an essential need to find a solution to the problem of the refinement of processes no longer using organic solvents, both during the manufacture of the transfer agent and during synthesis by RAFT means of the polymers. The skilled man in the art is thus now examining the documents available to him to attain this goal: the latter may be classified in various categories.

The skilled man in the art is notably familiar with the processes for the manufacture of copolymers of acrylic acid with other hydrosoluble monomers using RAFT technology and particular transfer agents: xanthates. This method is designated in the literature by the term MADIX (Macromolecular Design via Interchange of Xanthates).

Thus, the document "Direct synthesis of double hydrophilic statistical di- and triblock copolymers comprised of acrylamide and acrylic acid units via the MADIX process" (Macromolecules Rapid Communications (2001), 22, 18, pages 1497-1503) teaches the synthesis of various copolymers of acrylic acid and of acrylamide by this means, using particular xanthates having the general formula RS(C=S)OR'.

In this publication, the synthesis of these xanthates is accomplished in the presence of pyridine, ethylene glycol and dichloromethane. Moreover, it appears that the various copolymers are manufactured in an essentially aqueous medium, but one which must necessarily contain isopropylic alcohol to dissolve the xanthates (see page 1498).

Similarly, document WO 98/58974 describes a process of the MADIX type for the synthesis of block polymers, from ethylenically unsaturated monomers, an initiator of radical polymerisation, and xanthates. Examples 1.1 to 1.12 demonstrate that the xanthates are always manufactured in the presence of organic solvents. It is thus possible to polymerise acrylic acid in a medium which may contain water, but necessarily another solvent such as acetone (examples 2.25 to 2.28).

One is also familiar with document WO 02/14535 which describes the synthesis of block copolymers of acrylic acid and acrylamide by the MADIX technique in a reactional medium containing water and a solvent such as isopropylic alcohol. The choice of solvent, as indicated on page 22, enables certain properties of the polymer, such as its molecular mass, to be regulated. In accordance with the MADIX techniques, the transfer agents are non-hydrosoluble xanthates.

With regard to the problem posed to the skilled man in the art, these processes are thus not satisfactory, since although it is possible to use water in the polymerisation medium, other organic solvents are still essential for it. In addition, the synthesis of the xanthates itself involves solvents other than water.

The skilled man in the art then turns to another group of processes of the RAFT type, in which the polymerisation of acrylic acid is accomplished in an exclusively aqueous medium.

Thus, document FR 2 821 620 describes a process of polymerisation of the RAFT type of acrylic acid and of its salts, in an aqueous or hydro-alcoholic system, leading to polymers of low polymolecularity, using particular compounds of the type RX(C=S)R' as transfer agents. It seems however on reading the examples that these agents are manufactured in the presence of a solvent which is eliminated by filtration and/or evaporation (example 1 tests 1 to 8).

Similarly, "Functional polymers from novel carboxy-terminated trithiocarbonates as highly efficient RAFT agents" (Polymer Preprints (2002), 43(2), 122-123) describes a process for synthesis of S,S' (α,α' dimethylacetic acid) trithiocarbonate by reaction of $CS_2$ with hydroxide ions, followed by alkylation in the presence of chloroform and acetone. This product is used as a transfer agent to polymerise alkyl acrylates, acrylic acid and styrene, using a RAFT technique, in the presence of solvents such as butylic alcohol, acetone, an aromatic solvent and water in the precise case in which it is desired to polymerise acrylic acid.

The skilled man in the art is also familiar with document WO 03/66685. This presents the polymerisation by RAFT means with a high yield, a low polymolecularity index, and inspection of the structures obtained, of polymers and copolymers in a solvent. Water may be used as a solvent and acrylic acid is claimed in the list of polymerisable monomers. Nevertheless, synthesis of the transfer agent is complex. In addition, it uses solvents other than water and temperatures which are sometimes high (over 100° C.). As an illustration, example 11 describes the synthesis of naphtyl dithiocarbonylthio, which includes (among other stages) a stage of heating to 145° C. for 4 hours, a stage of dissolution in ethanol at 70° C., and a stage of purification in acetone and hexane.

Finally, the skilled man in the art is familiar with the document U.S. Pat. No. 6,596,899 which describes particular trithiocarbonates compounds (S,S' bis(α,α' disubstituated α" acetic acid) and its derivatives), enabling monomers such as acrylic acid to be polymerised by RAFT means. Polymerisation is undertaken in the possible presence of solvents such as $C_6$-$C_{12}$ alkanes, toluene, chlorobenzene, acetone, dimethylformamide, or water. These solvents are chosen so that they will not themselves act as transfer agents. Conversely, the synthesis of trithiocarbonate compounds is accomplished in the presence of organic solvents in which the reactive compounds are soluble.

Although they reveal the possibility of accomplishing polymerisations of acrylic acid by RAFT means in aqueous media, these documents do not constitute acceptable solutions to the problem posed to the skilled man in the art. In fact the transfer agents used must be systematically manufactured in the presence of organic solvents.

Finally, the skilled man in the art is familiar with document FR 2 842 814. The latter describes a process for polymerisation of the RAFT type of acrylic acid in an aqueous solution, with a transfer agent which is a xanthic α-substituent β-carboxylate salt synthesised in-situ in the aqueous solution. In his knowledge it is the only document in which the polymerisation of acrylic acid and the manufacture of the transfer agents do not use organic solvents. But this solution remains problematic. The xanthic salts give off a nauseous odour, which is found in the synthesised polymer. This odour constitutes a problem, both for the personnel involved in manufacturing the said polymers, and for the end user.

There is thus an evident requirement for the skilled man in the art to manufacture by RAFT means, without using organic solvents, and without using odorous xanthic salts, homopolymers of acrylic acid and copolymers of acrylic acid with other hydrosoluble monomers.

This need is reinforced by recent works which demonstrate, for the first time, that polyacrylic acid synthesised by the RAFT technique proves to be extremely effective as a dispersion agent for mineral matter in water: "Synthesis and characterization of poly(acrylic acid) produced by RAFT polymerization: application as a very efficient dispersant of $CaCO3$, kaolin, and $TiO2$", Macromolecules, 2003, 36, 3066-3077). This effectiveness in terms of dispersion was well known for polyacrylic acid as such, but had never been demonstrated in the case of a homopolymer obtained using the RAFT technique.

However, the only global teaching which this document indicates is that the reduction of the polymolecularity index of the dispersant agent is a major factor in the dispersion of mineral charges such as titanium dioxide, calcium carbonate or kaolin.

This document cites firstly complicated adsorption phenomena for calcium carbonate and kaolin (page 3076 lines 5-7), and secondly synthesis conditions which are unsatisfactory for the skilled man in the art: the polymerisation of acrylic acid is undertaken in the presence of methanol, ethanol, propanol-2 or diethylene dioxide, with all the problems of competition which may potentially exist between the solvent and the transfer agent.

At this stage, the Applicant continued with his research, and found in a surprising manner new homopolymers of acrylic acid with other hydrosoluble monomers manufactured by RAFT means, without using organic solvents, without using odorous xanthic salts, and having carboxylic groups at the end of the chain in accordance with formula (I), refining a process for controlled radical polymerisation of the RAFT type, in water, which uses non-odorous transfer agents manufactured in water. These new polymers have a conversion rate of over 90%, a polymolecularity index of under 2.2, and contain at the end of the chain a pattern which is in accordance with formula (I).

At this stage, the Applicant is keen to indicate the techniques for measuring these various magnitudes, which will be the same throughout the remainder of the present application. The conversion rate is measured by high performance liquid chromatography (HPLC). In this method, the components constituting the mixture are separated on a stationary phase and detected by a UV detector. After calibration of the detector, it is possible, starting from the area of the peak corresponding to the acrylic compound, to obtain the quantity of residual acrylic acid. This method forms part of the state of the art, and is described in numerous reference works, such as, for example, in the manual "Experimental Organic Chemistry", by M. Chavanne, A. Julien, G. J. Beaudoin, E. Flamand, second Edition, Editions Modulo, chapter 18, pages 271-325.

The average molecular mass by weight and the polymolecularity index are determined in aqueous media by a gel permeation chromatographic (GPC) method the standard for which is a series of 5 sodium polyacrylate standards supplied by Polymer Standard Service as references PAA 18K, PAA 8K, PAA 5K, PAA 4K and PAA 3K.

The Applicant stipulates in this respect that polyacrylate calibration is chosen since he feels that it is the most appropriate one for acrylic polymers, and since the results obtained depend on the type of calibration used, particularly for the polymolecularity index.

In addition, homopolymers of acrylic acid and/or copolymers of acrylic acid with hydrosoluble monomers according to the invention have a polymolecularity index of under 2.2 and, finally, prove to be grinding and/or co-grinding aid agents, and very effective dispersion agents for aqueous suspensions of mineral matter.

The object of the invention concerns homopolymers of acrylic acid and/or of copolymers of acrylic acid with other hydrosoluble monomers, obtained by a process of controlled radical polymerisation of the RAFT type, in water, of homopolymers of acrylic acid and/or copolymers of acrylic acid with other hydrosoluble monomers, using as a transfer agent compounds of formula (I'):

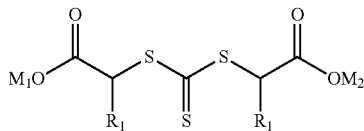

where $R_1$ designates an alkyl radical having 1 to 10 carbon atoms, an aromatic radical possibly substituted by an alkyl chain having 1 to 4 carbon atoms;

and where $M_1$ and $M_2$ designate the hydrogen atom, an amine salt, ammonium or an alkaline cation, and are identical or different.

These homopolymers of acrylic acid and/or copolymers of acrylic acid with other hydrosoluble monomers have a polymolecularity index of under 2.2 and contain at the end of the chain a pattern which is in accordance with formula (I):

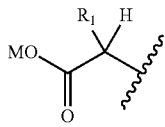

where $R_1$ designates an alkyl radical having 1 to 10 carbon atoms, an aromatic radical possibly substituted by an alkyl chain having 1 to 4 carbon atoms;

and where M designates the hydrogen atom, an amine salt, ammonium or an alkaline cation, and are identical or different.

Another object of the invention is the use of the said homopolymers of acrylic acid and/or of the said copolymers of acrylic acid with other hydrosoluble monomers, as agents for grinding and/or co-grinding of mineral matter in water.

Another object of the invention is the use of the said homopolymers of acrylic acid and/or of the said copolymers of acrylic acid with other hydrosoluble monomers, as dispersing agents of mineral matter in water. The Applicant stipulates at this point that all dispersants familiar to the skilled man in the art are not necessarily grinding aid agents.

Another object of the invention concerns the said aqueous dispersions and suspensions of mineral matter.

Another object of the invention is the use of the said dispersions and suspensions of mineral matter in paper formulations, and notably in paper coating colours and mass fillings, in paint, plastic, cement formulations, in formulations for the treatment of water, in detergent and cosmetic formulations, and in drilling muds.

Another object of the invention is the direct use, as a dispersant agent, of homopolymers of acrylic acid and/or of copolymers of acrylic acid with other hydrosoluble monomers according to the invention, in paper formulations, and notably in paper coating colours and mass fillings, in paint, cement formulations, in formulations for the treatment of water, in detergent, cosmetic and ceramic formulations, and in drilling muds.

Another object of the invention concerns the direct use, as a scale inhibitor agent, of homopolymers of acrylic acid and/or copolymers of acrylic acid with other water-soluble monomers according to the invention, in formulations for the treatment of water.

Another object of the invention concerns paper formulations, and notably paper coating colours and mass fillings, paint, plastic, cement and ceramic formulations, formulations for the treatment of water, detergent and cosmetic formulations, and drilling muds, obtained through the use in the said formulations of the aqueous dispersions and suspensions of mineral matter according to the invention.

Another object of the invention also concerns formulations for the treatment of water, obtained by direct use of polymers according to the invention as a scale inhibitor agent.

A final object of the invention concerns paper formulations, and notably paper coating colours and mass fillings, paint, cement and ceramic formulations, formulations for the treatment of water, detergent and cosmetic formulations, and drilling muds, obtained by direct use as a dispersant agent in the said formulations of the polymers according to the invention.

Thus, the object of the invention concerns the homopolymers of acrylic acid and/or copolymers of acrylic acid obtained by the controlled radical polymerisation process of the RAFT type, in water, and characterised in that they have a polymolecularity index of under 2.2, and contain at the end of the chain a pattern in accordance with formula (I):

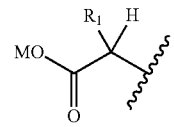

where $R_1$ designates an alkyl radical having 1 to 10 carbon atoms, an aromatic radical possibly substituted by an alkyl chain having 1 to 4 carbon atoms;

and where M designates the hydrogen atom, an amine salt, ammonium or an alkaline cation.

The amines are chosen from among the aliphatic and/or cyclic primary, secondary or tertiary amines such as, for example, stearylamine, the ethanolamines (mono-, di-, triethanolamine), mono and diethylamine, cyclohexylamine, methylcyclohexylamine, amino methyl propanol and morpholine.

The alkaline cations are chosen from among sodium, potassium and lithium.

Preferentially, $R_1$ is an alkyl radical having 2 to 6 carbon atoms, and M designates the hydrogen atom, sodium or potassium.

In a more preferential manner, $R_1$ is an alkyl radical having 2 to 6 carbon atoms, and M designates the hydrogen atom or sodium.

In a yet more preferential manner, $R_1$ is an alkyl radical having 2 to 4 carbon atoms, and M designates the hydrogen atom or sodium.

In a yet more preferential manner, $R_1$ is the alkyl radical having 4 carbon atoms, and M designates the hydrogen atom or sodium.

In a yet more preferential manner, $R_1$ is the alkyl radical having 4 carbon atoms, and M designates sodium.

The copolymers of acrylic acid with other hydrosoluble monomers according to the invention are also characterised in that the hydrosoluble monomers are chosen from methacrylic acid, itaconic acid, maleic acid, 2-acrylamido-2-methyl-1-propane sulphonic acid in acid form or partially neutralised, 2-methacrylamido-2-methyl-1-propane sulphonic acid in acid form or partially neutralised, 3-methacrylamido-2-hydroxy-1-propane sulphonic acid in acid form or partially neutralised, allylsulphonic acid, methallylsulphonic acid, allyloxybenzene sulphonic acid, methallyloxybenzene sulphonic acid, 2-hydroxy-3-(2-propenyloxy)propane sulphonic acid, 2-methyl-2-propene-1-sulphonic acid, ethylene sulphonic acid, propene sulphonic acid, styrene sulphonic acid, as well as all their salts, vinyl sulphonic acid, sodium methallylsulfonate, sulfopropyl acrylate or methacrylate, sulfomethylacrylamide, sulfomethylmethacrylamide or from among acrylamide, methylacrylamide, n-methylolacrylamide, n-acryloylmorpholine, ethylene glycol methacrylate, ethylene glycol acrylate, propylene glycol methacrylate, propylene glycol acrylate, methoxy polyethylene glycol acrylate, methoxy polyethylene glycol methacrylate, propene phosphonic acid, phosphate of acrylate or methacrylate of ethylene or propylene glycol or from among vinylpyrrolidone, methacrylamido propyl trimethyl ammonium chloride or sulphate, trimethyl ammonium ethyl chloride or sulphate methacrylate, as well as their acrylate and acrylamide counterparts, whether quaternised or not, and/or ammonium dimethyldiallylchloride, and mixtures thereof.

Homopolymers of acrylic acid and/or copolymers of acrylic acid with other hydrosoluble monomers obtained according to the invention, are also characterised in that they have an average molecular mass by weight ($M_w$) of between 1000 g/mole and 100,000 g/mole, preferentially between 1000 g/mole and 50,000 g/mole, very preferentially between 1000 g/mole and 30,000 g/mole, and extremely preferentially between 1000 g/mole and 20,000 g/mole, according to the method described above.

Homopolymers of acrylic acid and/or copolymers of acrylic acid with other hydrosoluble monomers obtained according to the invention are also characterised in that they have a conversion rate of over 90%, preferentially of over 95%, and very preferentially of over 99%.

These homopolymers and/or these copolymers according to the invention are either in their acid form, i.e. non-neutralised, or partially or totally neutralised by one or more monovalent, divalent or trivalent neutralisation agents, or neutralisation agents with higher valencies, or mixtures thereof.

The monovalent neutralisation agents are chosen from the group constituted by the compounds containing alkaline cations, particularly sodium and potassium, or again lithium, ammonium, or again the aliphatic and/or cyclic primary or secondary amines such as, for example, the ethanolamines, mono- and diethylamine, or cyclohexylamine.

The divalent or trivalent neutralisation agents, or neutralisation agents with higher valency, are chosen from the group constituted by the compounds containing divalent cations belonging to the alkaline earths, particularly magnesium and calcium, or again zinc, and also from the trivalent cations, particularly aluminium, or again from certain compounds containing cations with a higher valency.

Another object of the invention is the use as agents to aid grinding and/or co-grinding of mineral matter in water, of the homopolymers of acrylic acid and/or copolymers of acrylic acid, according to the invention.

The Applicant stipulates that the operation to grind the mineral substance to be refined consists in grinding the mineral substance with a grinding body into very fine particles in an aqueous medium containing the grinding aid agent. In a different manner, the dispersion operation consists in suspending the mineral matter in water, in the presence of a dispersant agent, to obtain by this means a suspension which is stable over time, without reducing the particles' size.

In addition, the Applicant stipulates that the co-grinding operation consists in grinding a mixture of at least 2 mineral fillers.

Thus, the grinding body, of granulometry advantageously of between 0.20 and 4 millimeters, is added to the aqueous suspension of the mineral substance for grinding. The grinding body generally has the form of particles of materials as diverse as silicon oxide, aluminium oxide, zirconium oxide or mixtures thereof, together with synthetic resins of great hardness, steels or other. An example of the composition of such grinding bodies is given by patent FR 2 303 681 which describes the grinding elements formed 30% to 70% by weight of zirconium oxide, 0.1% to 5% of aluminium oxide, and 5 to 20% of silicon oxide.

The grinding body is preferably added to the suspension in a quantity such that the ratio by weight between this grinding material and the mineral substance to be ground is at least 2/1, this ratio being preferably between the limits 3/1 and 5/1.

The mixture of the suspension and of the grinding body is then subjected to the mechanical stirring action, as this occurs in a traditional grinder with micro-elements.

The time required to attain the desired refinement of the mineral substance after grinding varies according to the nature and quantity of the mineral substances to be ground, and according to the stirring method used and the temperature of the medium during the grinding operation.

The use as agents to aid grinding and/or co-grinding of mineral matter in water, of the polymers according to the invention is also characterised in that the mineral matter is chosen from among natural or synthetic calcium carbonate, the dolomites, kaolin, talc, gypsum, titanium oxide, satin white or aluminium trihydroxide, mica and mixtures of at least two of these fillers, such as talc-calcium carbonate mixtures, calcium carbonate-kaolin mixtures or mixtures of calcium carbonate with aluminium trihydroxide, or again mixtures with synthetic or natural fibres or again mineral co-structures such as talc-calcium carbonate or talc-titanium dioxide co-structures. These mineral matters are preferentially a calcium carbonate chosen from among marble, calcite, chalk, or mixtures thereof.

The use as agents to aid grinding and/or co-grinding of mineral matter in water of the polymers according to the invention is also characterised in that 0.05% to 5% by dry weight of the polymers according to the invention is used, relative to the dry weight of the mineral matter, and again more particularly 0.1% to 3% by dry weight of the polymers according to the invention, relative to the dry weight of mineral matter.

Another object of the invention is the use as dispersant agents of mineral matter in water of the homopolymers of acrylic acid and/or of the copolymers of acrylic acid with hydrosoluble monomers, according to the invention.

The use as dispersant agents of mineral matter in water of the polymers according to the invention is also characterised in that the mineral matter is chosen from among natural or synthetic calcium carbonate, the dolomites, kaolin, talc, gypsum, satin white or aluminium trihydroxide, mica and mixtures of at least two of these fillers, such as talc-calcium carbonate mixtures, calcium carbonate-kaolin mixtures or mixtures of calcium carbonate with aluminium trihydroxide, or again mixtures with synthetic or natural fibres or again mineral co-structures such as talc-calcium carbonate or talc-titanium dioxide co-structures.

These mineral matters are preferentially a calcium carbonate chosen from among marble, calcite, chalk, or mixtures thereof.

The use as dispersant agents of mineral matter in water of the polymers according to the invention is also characterised in that 0.05% to 5% by dry weight of the polymers according to the invention is used, relative to the dry weight of the mineral matter, and again more particularly 0.1% to 3% by dry weight of the polymers according to the invention, relative to the dry weight of mineral matter.

Another object of the invention concerns aqueous suspensions and dispersions of mineral matter obtained by use of the polymers according to the invention.

Aqueous suspensions of mineral matter according to the invention are characterised in that the mineral matter is chosen from among natural or synthetic calcium carbonate, the dolomites, kaolin, talc, gypsum, titanium oxide, satin white or aluminium trihydroxide, mica and mixtures of at least two of these fillers, such as talc-calcium carbonate mixtures, calcium carbonate-kaolin mixtures or mixtures of calcium carbonate with aluminium trihydroxide, or again mixtures with synthetic or natural fibres or again mineral co-structures such as talc-calcium carbonate or talc-titanium dioxide co-structures. These mineral matters are preferentially a calcium carbonate chosen from among marble, calcite, chalk, or mixtures thereof.

Aqueous dispersions of mineral matter according to the invention are characterised in that the mineral matter is chosen from among natural or synthetic calcium carbonate, the dolomites, kaolin, talc, gypsum, satin white or again aluminium trihydroxide, mica and mixtures of at least two of these fillers, such as talc-calcium carbonate mixtures, calcium carbonate-kaolin mixtures or mixtures of calcium carbonate with aluminium trihydroxide, or again mixtures with synthetic or natural fibres or again mineral co-structures such as talc-calcium carbonate or talc-titanium dioxide co-structures. These mineral matters are preferentially a calcium carbonate chosen from among marble, calcite, chalk, or mixtures thereof.

The aqueous suspensions and dispersions of mineral matter according to the invention are characterised in that they contain 0.05% to 5% by dry weight of the polymers according to the invention relative to the dry weight of mineral matter, and again more particularly 0.1% to 3% by dry weight of the polymers according to the invention, relative to the dry weight of mineral matter.

Another object of the invention is the use of the aqueous dispersions and suspensions of mineral matter according to the invention in paper formulations, and notably in paper coating colours and mass fillings, in paint, plastic, cement and ceramic formulations, in formulations for the treatment of water, in detergent and cosmetic formulations, and in drilling muds.

Another object of the invention is the direct use as dispersant agents in paper formulations, and notably in paper coating colours and mass fillings, in paint, ceramic and cement formulations, in formulations for the treatment of water, in detergent and cosmetic formulations, and in drilling muds, of the polymers obtained according to the invention.

This direct use in paper formulations, and notably in coating colours and mass fillings, in paint, plastic and cement formulations, in formulations for the treatment of water, in detergent and cosmetic formulations and in drilling muds, of the polymers according to the invention, is also characterised in that 0.05% to 3% by dry weight of the polymers according to the invention is used, relative to the dry weight of mineral matter, and again more particularly 0.1% to 3% by dry weight of the polymers according to the invention, relative to the dry weight of mineral matter.

Another object of the invention concerns the direct use, as a scale inhibitor agent, of homopolymers of acrylic acid and/or copolymers of acrylic acid with other water-soluble monomers according to the invention, in formulations for the treatment of water.

Another object of the invention also concerns formulations for the treatment of water, obtained by direct use of polymers according to the invention as a scale inhibitor agent.

A final object of the invention concerns paper formulations, and notably paper coating colours and mass fillings, paint, plastic, ceramic and cement formulations, formulations for the treatment of water, detergent and cosmetic formulations, and drilling muds, obtained according to the invention.

The scope and interest of the invention will be better appreciated through the following examples, which are by no means limitative.

EXAMPLE 1

The object of this example is to present the synthesis of compounds used for the manufacture of the homopolymers and copolymers according to the invention.

Test no 1
Preparation of compound A of formula:

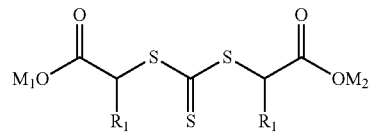

where $R_1$ designates the alkyl radical having 4 carbon atoms;
and $M_1$ and $M_2$ designate the sodium atom Na.

In a beaker being stirred by magnetic means, the following are weighed:
30 grams of water;
19.5 grams of 2 bromohexanoic acid.

The mixture is neutralised with a 50% soda solution until a pH equal to 6.5 is obtained. The temperature rises to 52° C. A homogeneous solution is then obtained, which is cooled to 43° C.

30.8 grams of an aqueous solution of 25% disodic trithiocarbonate solution is then poured drop by drop during a 20-minute period.

It is left to react for 2 hours, under stirring action. The S alkylation reaction is slightly exothermic and the temperature increases to 47° C., while the pH settles at 10.

A clear yellow solution is obtained containing compound A.

EXAMPLE 2

The purpose of this example is to illustrate how homopolymers of acrylic acid according to the invention are obtained through the use of sulphur compounds in a controlled radical polymerisation process of the RAFT type, in water.

Test no 2
In a 1-liter reactor fitted with a mechanical stirrer and heating of the oil bath type, the following is introduced:
150 grams of water;
50 grams of acrylic acid;
17.1 gr
ams of a 17.1% solution containing the compound of formula (I'):

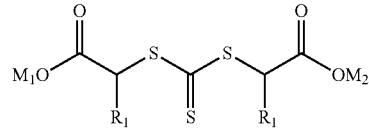

where $R_1$ designates the alkyl radical having 1 carbon atom;
and $M_1$ and $M_2$ designate the sodium atom Na.

0.4 grams of a polymerisation initiator 4,4' azobis(4-cyanopentanoic) sold by the company Aldrich under the name V501.

Whilst stirring, the mixture is heated to a temperature equal to 100° C. The temperature is then maintained at 95° C. for 2 hours. A clear, slightly orangey solution is then obtained, which is cooled to ambient temperature.

This solution is neutralised with soda until a pH of 8.5 is obtained; a solution is then obtained which contains a homopolymer of acrylic acid neutralised by sodium.

Test no 3

In a 1-liter reactor fitted with a mechanical stirrer and heating of the oil bath type, the following is introduced:
  300 grams of water;
  100 grams of acrylic acid;
  34 grams of a solution containing the compound of formula (I'):

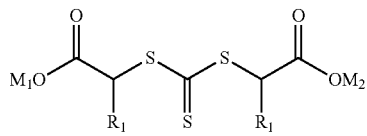

where $R_1$ designates the alkyl radical having 1 carbon atom;
and $M_1$ and $M_2$ designate the sodium atom Na.
  0.8 grams of a polymerisation initiator 4,4' azobis(4-cyanopentanoic) sold by the company Aldrich under the name V501.

Whilst stirring, the mixture is heated to a temperature equal to 100° C. The temperature is then maintained at 95° C. for 2 hours.

A clear, slightly orangey solution is then obtained, which is cooled to ambient temperature.

This solution is neutralised with a molar mixture of 30% lime and 70% soda until a pH of 8.5 is obtained; a solution is then obtained which contains a homopolymer of acrylic acid neutralised 30% by calcium and 70% by sodium.

Test no 4

In a 1-liter reactor fitted with a mechanical stirrer and heating of the oil bath type, the following is introduced:
  150 grams of water;
  50 grams of acrylic acid;
  17.07 grams of the test solution no 1 containing compound A;
  0.4 grams of a polymerisation initiator 4,4' azobis(4-cyanopentanoic) sold by the company Aldrich under the name V501.

Whilst stirring, the mixture is heated to a temperature equal to 100° C.

The temperature is then maintained at 95° C. for 2 hours. A clear, slightly orangey solution is then obtained, which is cooled to ambient temperature.

This solution is neutralised with a molar mixture of 30% lime and 70% soda until a pH of 8.5 is obtained; a solution is then obtained which contains a homopolymer of acrylic acid neutralised 30% by calcium and 70% by sodium.

Test no 5

In a 1-liter reactor fitted with a mechanical stirrer and heating of the oil bath type, the following is introduced:
  300 grams of water;
  100 grams of acrylic acid;
  23.9 grams of the test solution no 1 containing compound A;
  0.56 grams of a polymerisation initiator 4,4' azobis(4-cyanopentanoic) sold by the company Aldrich under the name V501.

Whilst stirring, the mixture is heated to a temperature equal to 100° C. The temperature is then maintained at 95° C. for 2 hours. A clear, slightly orangey solution is then obtained, which is cooled to ambient temperature.

This solution is neutralised with soda until a pH of 8.5 is obtained; a solution is then obtained which contains a homopolymer of acrylic acid neutralised by sodium.

Test no 6

In a 1-liter reactor fitted with a mechanical stirrer and heating of the oil bath type, the following is introduced:
  300 grams of water;
  100 grams of acrylic acid;
  16.8 grams of the solution of test no 1;
  1.04 grams of a polymerisation initiator 4,4' azobis(4-cyanopentanoic) sold by the company Aldrich under the name V501.

Whilst stirring, the mixture is heated to a temperature equal to 100° C. The temperature is then maintained at 95° C. for 2 hours. A clear, slightly orangey solution is then obtained, which is cooled to ambient temperature.

This solution is neutralised with soda until a pH of 8.5 is obtained; a solution is then obtained which contains a homopolymer of acrylic acid neutralised by sodium.

Test no 7

In a 1-liter reactor fitted with a mechanical stirrer and heating of the oil bath type, the following is introduced:
  300 grams of water;
  100 grams of acrylic acid;
  18.6 grams of the test solution no 1 containing compound A;
  0.44 grams of a polymerisation initiator 4,4' azobis(4-cyanopentanoic) sold by the company Aldrich under the name V501.

Whilst stirring, the mixture is heated to a temperature equal to 100° C. The temperature is then maintained at 95° C. for 2 hours.

A clear, slightly orangey solution is then obtained, which is cooled to ambient temperature.

This solution is neutralised with soda until a pH of 8.5 is obtained; a solution is then obtained which contains a homopolymer of acrylic acid neutralised by sodium.

For all the tests no 2 to 7, the rate of conversion of the polymer is obtained by HPLC, its molecular mass by weight ($M_w$) and its polymolecularity index are obtained by GPC, together with the presence of the pattern of formula (I) at the end of the polymer chain using the methods which have been previously set out, and through the use for the HPLC analysis of an HPLC set of Philips brand of reference PU 4100 equipped with a UV/visible detector of reference PU 4110, for the GPC analysis of a GPC machine of Waters brand, consisting of a Waters 515 pump, of one or two Ultrahydrogel linear columns of dimensions 7.8 mm×30 cm (pore diameter 120 to 2000 Å) with a guard column and a Waters refractrometer of reference 410, and finally, for the MALDI TOF analysis, a time of flight machine called Voyager-DE STR from PerSeptive Biosystems, using a nitrogen laser (337 nm) and an acceleration voltage of 20 kV.

The corresponding results are grouped together in table 1.

TABLE 1

| Test n° | Neut. Sys. | $M_w$ | $I_p$ | $T_c$ (%) |
|---|---|---|---|---|
| 2 | Na | 6800 | 1.60 | 99.1 |
| 3 | 30% Ca 70% Na | 6300 | 1.55 | 99.2 |

TABLE 1-continued

| Test n° | Neut. Sys. | $M_w$ | $I_p$ | $T_c$ (%) |
|---|---|---|---|---|
| 4 | 30% Ca 70% Na | 6700 | 1.72 | 99.8 |
| 5 | Na | 8000 | 2.10 | 99.6 |
| 6 | Na | 11800 | 1.95 | 98.9 |
| 7 | Na | 9600 | 2.04 | 99.0 | characteristics of the homopolymers of acrylic acid according to the invention with:
Neut. Sys.: nature of the neutralisation system
$M_w$: molecular mass by weight (g/mole)
$I_p$: polymolecularity index
$T_c$: conversion rate (%)

Tests no 2 to 7 demonstrate that it was possible to obtain homopolymers of acrylic acid according to the invention having a polymolecularity index of under 2.2 and a conversion rate higher than 98%, and having a pattern of formula (I) at the end of the chain.

EXAMPLE 3

This example illustrates the use of a polymer according to the invention as a grinding aid agent of mineral matter and more specifically calcium carbonate. This example also illustrates the obtaining of aqueous suspensions of calcium carbonate according to the invention.

It should also be noted that these suspensions of calcium carbonate according to the invention are refined, highly concentrated with mineral matter and easily handled by the end user, i.e. easily used both for coating of paper and for mass-filling of paper.

To do so, an aqueous suspension is prepared from calcium carbonate from the Orgon deposit (France), of median diameter of around 7 micrometers.

The aqueous suspension has a dry matter concentration of 76% by weight relative to the total mass.

The grinding aid agent is introduced into this suspension in the quantities indicated in the table below, expressed as a percentage of dry weight relative to the dry calcium carbonate mass to be ground.

The suspension circulates in a grinder of the Dyno-Mill™ type with a fixed cylinder and rotating pulser, the grinding body of which is constituted by corundum balls of diameter in the range 0.6 millimeter to 1.0 millimeter.

The total volume occupied by the grinding body is 1,150 cubic centimeters, while its mass is 2,900 g.

The grinding chamber has a volume of 1,400 cubic centimeters.

The circumferential speed of the grinder is 10 meters per second.

The calcium carbonate suspension is recycled at a rate of 18 liters per hour.

The outlet of the Dyno-Mill™ is fitted with a 200 micron mesh separator enabling the suspension resulting from the grinding and the grinding body to be separated.

The temperature during each grinding test is maintained at 60° C. approximately.

On completion of the grinding ($T_0$), a sample of the pigment suspension is recovered in a flask.

The granulometry of the suspensions is determined using a Sedigraph™ 5100 granulometer from the company Micromeritics. The demand for dispersant is then calculated: it is defined as the % by weight of dry polymer used, relative to the dry weight of mineral fillers, to obtain a given granulometry. For all tests 8 to 11, this granulometry is determined such that 80% of the particles have an average diameter of less than 1 µm.

The Brookfield™ viscosity of the suspension is measured using a Brookfield™ viscometer type RVT, at a temperature of 25° C. and rotational speeds of 10 revolutions per minute and 100 revolutions per minute with the adequate spindle. The viscosity is read after one minute of rotation. By this means the initial viscosity of the suspension is obtained at T=0. After a rest time of 8 days the viscosity is measured again: this is the viscosity at T=8 days before stirring. The same viscosity measurement is undertaken after having stirred the suspension for 5 minutes. this is the viscosity at T=8 days after stirring.

Test no 8

This test illustrates the prior art and uses 1.06% by dry weight, relative to the dry weight of calcium carbonate, of a polyacrylate, obtained by a traditional process of radical polymerisation, of molecular weight equal to 5,600 g/mole, of polymolecularity index equal to 2.4 (as determined by the methods described above) and neutralised by a calcium-sodium mixture in a molar ratio equal to 30/70.

Test no 9

This test illustrates the prior art and uses 1.04% by dry weight, relative to the dry weight of calcium carbonate, of a polyacrylate, obtained by a process of radical polymerisation of the RAFT type, using dibenzil trithiocarbonate as a transfer agent, and polymerised in ethanol according to the method described in French patent application FR 2 821 620. This is a polyacrylate of molecular weight equal to 5,955 g/mole, of polymolecularity index equal to 1.95 (as determined by the methods described above) and neutralised by a calcium-sodium mixture in a molar ratio equal to 30/70.

Test no 10

This test illustrates the prior art and uses 1.00% by dry weight, relative to the dry weight of calcium carbonate, of a polyacrylate, obtained by a process of controlled radical polymerisation in water, using a carboxylate xanthate having the following formula:

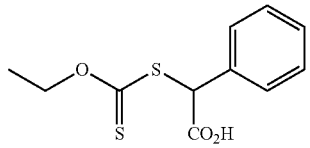

The manufactured polymer is a polyacrylate of molecular weight equal to 7,725 g/mole, of polymolecularity index equal to 2.00 (as determined by the methods described above) and neutralised by a calcium-sodium mixture in a molar ratio equal to 30/70.

Test no 11

This test illustrates the invention and uses the polyacrylate according to the invention of test no 4.

Test no 12

This test illustrates the invention and uses the polyacrylate according to the invention of example no 3.

The characteristics of the polymers used (molecular weight, polymolecularity index, conversion rate), the corresponding demand for polymer, together with the various measured Brookfield™ viscosities, are recorded in table 2.

TABLE 2 use as grinding aid agents of polyacrylates of the prior art and of polyacrylates according to the invention.

| n° test | Prior Art./ Inv. | Polymer | | | % in disp. | Brookfield ™ viscosity (mPa · s) | | | | | |
|---|---|---|---|---|---|---|---|---|---|---|---|
| | | | | | | T = 0 | | 8 days AVAG | | 8 days APAG | |
| | | $I_p$ | $M_w$ | $T_c$ | | 10 rpm | 100 rpm | 10 rpm | 100 rpm | 10 rpm | 100 rpm |
| 8 | Prior Art | 2.4 | 5600 | >99 | 1.07 | 2170 | 668 | 9413 | 1705 | 2423 | 794 |
| 9 | Prior Art | 1.95 | 5955 | 99.5 | 1.04 | 1724 | 498 | 3610 | 935 | 1454 | 464 |
| 10 | Prior Art | 2.00 | 7725 | 99 | 1.00 | 1693 | 522 | 6439 | 1384 | 1678 | 533 |
| 11 | Inv. | 1.72 | 6700 | 99.8 | 0.96 | 1313 | 376 | 2196 | 648 | 1290 | 395 |
| 12 | Inv. | 1.55 | 6300 | 99.2 | 0.99 | 951 | 308 | 1475 | 521 | 729 | 253 |

$I_p$: polymolecularity index
$M_w$: molecular weight (g/mole)
$T_c$: conversion rate (%)
% in disp.: demand for dispersant (% by dry polymer weight/dry weight of fillers)

The results of table 2 show that the polymers according to the invention have polymolecularity indices well below 2.2 and lower in all cases to those of the polymers of the prior art.

It is thus demonstrated that the polymers according to the invention are more monodisperse than those of the prior art.

In addition, the demand for polymer according to the invention is still lower than the demand for polymer of the prior art: this represents a net advantage for the end user.

Finally, the suspensions of mineral fillers manufactured with the polymers according to the invention are more stable over time than those obtained from the polymers of the prior art: the polymers according to the invention are thus more effective than those of the prior art.

EXAMPLE 4

The purpose of this example is to illustrate the preparation of homopolymers of acrylic acid according to the invention, and the homopolymers according to the invention thus obtained.

For tests no 13 to no 21, one starts by introducing, into a 2-liter reactor fitted with a mechanical stirrer and heating of the oil bath type, water and an aqueous solution containing the sulphurous transfer agent which is compound A obtained in test no 1.

Whilst stirring, the solution at the bottom of the reactor is then heated to a temperature equal to 95° C.

Keeping this temperature constant at ±2° C., one adds, during a period of 1 hour and using peristaltic pumps, the acrylic acid and the catalysts (sodium persulphate and metabisulphite, respectively $Na_2S_2O_8$ and $Na_2S_2O_5$). The temperature is then kept constant at 95° C.±2° C. for 2 hours.

The solution obtained is neutralised with soda until pH=8.5. One then obtains a clear, slightly orangey solution, which is cooled to ambient temperature and which contains a homopolymer of acrylic acid according to the invention, neutralised by sodium.

Table 3 indicates the quantity (in grams) of the various products used, together with the molecular weight $M_w$ (in g/mole), the polymolecularity index $I_p$ and the conversion rate $T_c$, measured for the polymers obtained, which parameters are determined according to the methods described above in the present application.

TABLE 3 homopolymers of acrylic acid according to the invention

| Test n° | Constituent elements (masses in grams) | | | | | Properties of the homopolymers according to the invention | | |
|---|---|---|---|---|---|---|---|---|
| | Water | Acrylic acid | Transfer agent* | Catalysts | | | | |
| | | | | $Na_2S_2O_8$ | $Na_2S_2O_5$ | $M_w$ | $I_p$ | $T_c$ |
| 13 | 400 | 400 | 180 | 4.68 | 1.336 | 4640 | 1.83 | >99 |
| 14 | 400 | 400 | 138.4 | 3.51 | 1.002 | 6550 | 1.80 | >99 |
| 15 | 400 | 400 | 138.4 | 5.85 | 1.67 | 7075 | 1.87 | >99 |
| 16 | 400 | 400 | 108 | 4.68 | 1.336 | 8420 | 2.10 | >99 |
| 17 | 400 | 400 | 90 | 2.34 | 0.668 | 10235 | 1.90 | >99 |
| 18 | 400 | 400 | 90 | 4.68 | 1.336 | 10940 | 1.80 | >99 |
| 19 | 400 | 400 | 77.5 | 3.51 | 1.002 | 12600 | 2.08 | >99 |
| 20 | 400 | 400 | 77.5 | 4.68 | 1.336 | 14940 | 2.18 | >99 |
| 21 | 400 | 400 | 76.6 | 4.68 | 1.336 | 16120 | 2.18 | >99 |

$I_p$: polymolecularity index
$M_w$: molecular weight (g/mole)
$T_c$: conversion rate (%)
*the transfer agent mass corresponds to the mass of an aqueous solution containing the said transfer agent, where the latter is diluted to 22% by weight.

Table 3 demonstrates that homopolymers of acrylic acid according to the invention are obtained:
- having a polymolecularity index lower than 2.2 determined in aqueous media by a gel permeation chromatographic (GPC) method having as a standard a series of 5 sodium polyacrylate standards supplied by Polymer Standard Service as references PAA 18K, PAA 8K, PAA 5K, PAA 4K and PAA 3K;
- having a molecular weight of between 1000 g/mole and 20000 g/mole;
- and having a conversion rate higher than 99%.

EXAMPLE 5

The purpose of this example is to illustrate the preparation of homopolymers of acrylic acid according to the invention, and the homopolymers according to the invention thus obtained.

For tests no 22 to no 27, one starts by introducing, into a 2-liter reactor fitted with a mechanical stirrer and heating of the oil bath type, water and an aqueous solution containing the sulphurous transfer agent which is compound A obtained in test no 1.

Whilst stirring, the solution at the bottom of the reactor is then heated to a temperature equal to 95° C.

Keeping this temperature constant at ±2° C., one adds, during a period of 1 hour and using peristaltic pumps, the acrylic acid and the catalysts (4,4' azobis(4-cyanopentanoic) sold by the company Aldrich under the name V501). The temperature is then kept constant at 95° C.±2° C. for 2 hours.

The solution obtained is neutralised with soda until pH=8.5. One then obtains a clear, slightly orangey solution, which is cooled to ambient temperature and which contains a homopolymer of acrylic acid according to the invention, neutralised by sodium.

Table 4 indicates the quantity (in grams) of the various products used, together with the molecular weight $M_w$ (in g/mole), the polymolecularity index $I_p$ and the conversion rate $T_c$, measured for the polymers obtained, which parameters are determined according to the methods described above in the present application.

TABLE 4 homopolymers of acrylic acid according to the invention

| Test n° | Constituent elements (masses in grams) | | | | Properties of the homopolymers according to the invention | | |
|---|---|---|---|---|---|---|---|
| | Water | Acrylic acid | Transfer agent* | Catalyst (V501) | $M_w$ | $I_p$ | $T_c$ |
| 22 | 300 | 100 | 173 | 4 | 1540 | 1.5 | >99 |
| 23 | 300 | 100 | 138.4 | 3.2 | 1730 | 1.53 | >99 |
| 24 | 300 | 100 | 103.8 | 2.4 | 2155 | 1.55 | >99 |
| 25 | 300 | 100 | 69.2 | 1.6 | 2830 | 1.54 | >99 |
| 26 | 300 | 100 | 51.9 | 8.51 | 3730 | 1.59 | >99 |
| 27 | 150 | 50 | 17.3 | 8.01 | 5600 | 1.52 | >99 |

$I_p$: polymolecularity index
$M_w$: molecular weight (g/mole)
$T_c$: conversion rate (%)
V501: 4,4'azobis(4-cyanopentanoic) sold by the company Aldrich under the name V501
*the transfer agent mass corresponds to the mass of an aqueous solution containing the said transfer agent, where the latter is diluted to 22% by weight.

The table obtained of the homopolymers of acrylic acid according to the invention:
- having a polymolecularity index lower than 2.2 determined in aqueous media by a gel permeation chromatographic (GPC) method having as a standard a series of 5 sodium polyacrylate standards supplied by Polymer Standard Service as references PAA 18K, PAA 8K, PAA 5K, PAA 4K and PAA 3K;
- having a molecular weight between 1000 g/mole and 20000 g/mole, and in this particular example between 1000 and 6000 g/mole;
- and having a conversion rate higher than 99%.

EXAMPLE 6

The purpose of this example is to illustrate the preparation of copolymers of acrylic acid with hydrosoluble monomers according to the invention, and the copolymers according to the invention thus obtained.

For tests no 28 to no 32, one starts by introducing, into a 2-liter reactor fitted with a mechanical stirrer and heating of the oil bath type, water and an aqueous solution containing the sulphurous transfer agent which is compound A obtained in test no 1.

Whilst stirring, the solution at the bottom of the reactor is then heated to a temperature equal to 50° C.

Keeping this temperature constant at ±2° C., one adds, for 2 hours and using peristaltic pumps, the acrylic acid, the water-soluble monomers and the catalysts (sodium persulphate and metabisulphite, respectively $Na_2S_2O_8$ and $Na_2S_2O_5$). The temperature is then kept constant at 50° C.±2° C. for 1 hour.

The temperature is then increased to 95° C. and the solution is neutralised with soda until pH=8.5. One then obtains a clear, slightly orangey solution, which is cooled to ambient temperature and which contains a copolymer of acrylic acid with water-soluble monomers according to the invention, neutralised by sodium.

Table 5 indicates the quantity (in grams) of the various products used, together with the molecular weight $M_w$ (in g/mole), the polymolecularity index $I_p$ and the conversion rate $T_c$, measured for the copolymers obtained, which parameters are determined according to the methods described above in the present application.

TABLE 5 copolymers of acrylic acid with water-soluble monomers according to the invention

| Test n° | Constituent elements (masses in grams) | | | | | | Properties of the copolymers according to the invention | | |
|---|---|---|---|---|---|---|---|---|---|
| | Water | Acrylic acid | Water-soluble monomer | Transfer agent* | $Na_2S_2O_8$ | $Na_2S_2O_5$ | $M_w$ | $I_p$ | $T_c$ |
| 28 | 200 | 100 | 100 (AMA) | 69.2 | 1.755 | 0.501 | 7620 | 1.94 | >99 |
| 29 | 200 | 140 | 120 (acrylamide) | 69.2 | 1.755 | 0.501 | 5900 | 1.53 | >99 |

TABLE 5-continued copolymers of acrylic acid with water-soluble monomers according to the invention

| Test n° | Constituent elements (masses in grams) | | | | | | Properties of the copolymers according to the invention | | |
|---|---|---|---|---|---|---|---|---|---|
| | Water | Acrylic acid | Water-soluble monomer | Transfer agent* | Catalysts | | $M_w$ | $I_p$ | $T_c$ |
| | | | | | $Na_2S_2O_8$ | $Na_2S_2O_5$ | | | |
| 30 | 200 | 180 | 26.7 (MADQUAT) | 69.2 | 1.755 | 0.501 | 5350 | 1.42 | >99 |
| 31 | 200 | 170 | 30 (HEMA) | 69.2 | 1.755 | 0.501 | 5975 | 1.56 | >99 |
| 32 | 200 | 190 | 10 (AMPS) | 69.2 | 1.755 | 0.501 | 5330 | 1.45 | >99 |

$I_p$: polymolecularity index
$M_w$: molecular weight (g/mole)
$T_c$: conversion rate (%)
AMA: methacrylic acid
AMPS: 2-acrylamido 2-methyl 1-propane sulphonic acid
MADQUAT: trimethylammonium ethyl chloride methacrylate
HEMA: ethylene glycol methacrylate
*the transfer agent mass corresponds to the mass of an aqueous solution containing the said transfer agent, where the latter is diluted to 22% by weight.

Table 5 demonstrates that copolymers of acrylic acid according to the invention are obtained:
  having a polymolecularity index lower than 2.2 determined in aqueous media by a gel permeation chromatographic (GPC) method having as a standard a series of 5 sodium polyacrylate standards supplied by Polymer Standard Service as references PAA 18K, PAA 8K, PAA 5K, PAA 4K and PAA 3K;
  having a molecular weight of between 1000 g/mole and 20000 g/mole;
  and having a conversion rate higher than 99%.

EXAMPLE 7

The purpose of this example is to illustrate the preparation of copolymers of acrylic acid with hydrosoluble monomers according to the invention, and the copolymers according to the invention thus obtained.

For tests no 33 to no 35, one begins by introducing, into a 1-liter reactor fitted with a mechanical stirrer and heating of the oil bath type:
  346 grams of an aqueous solution 50% by weight of dry monomer of methoxy polyethyleneglycol methacrylate of molecular weight 5000 g/mole;
  30 grams of acrylic acid;
  a given quantity of the sulphurous transfer agent of formula A obtained in test no 1 (tests no 33 to no 35 use respectively 6.3 grams, 12.6 grams and 25.2 grams of the said transfer agent).

Whilst stirring, the solution at the bottom of the reactor is heated to a temperature equal to 70° C., and an aqueous solution is introduced consisting of:
  0.8 gram of $(NH_4)_2S_2O_8$;
  10 grams of water;
It is left to react for 2 hours whilst maintaining the temperature at 82±2° C.

The solution obtained is then neutralised with soda until pH=7.1. One then obtains a solution which is cooled to ambient temperature and which contains a copolymer of acrylic acid with water-soluble monomers according to the invention, neutralised by sodium.

Table 6 indicates the molecular weight $M_w$ (in g/mole), the polymolecularity index $I_p$ and the conversion rate $T_c$, measured for the copolymers obtained, which parameters are determined according to the methods described above in the present application.

TABLE 6

| | Parameters of the copolymers according to the invention | | |
|---|---|---|---|
| Test n° | $M_w$ | $I_p$ | $T_c$ |
| 33 | 29470 | 1.44 | >99 |
| 34 | 52300 | 1.45 | >99 |
| 35 | 99500 | 1.67 | >99 | copolymers of acrylic acid with water-soluble monomers according to the invention
$I_p$: polymolecularity index
$M_w$: molecular weight (g/mole)
$T_c$: conversion rate (%)

Table 6 demonstrates that copolymers of acrylic acid according to the invention are obtained:
  having a polymolecularity index lower than 2.2 determined in aqueous media by a gel permeation chromatographic (GPC) method having as a standard a series of 5 sodium polyacrylate standards supplied by Polymer Standard Service as references PAA 18K, PAA 8K, PAA 5K, PAA 4K and PAA 3K
  having a molecular weight of between 1000 g/mole and 100,000 g/mole,
  and having a conversion rate higher than 99%.

EXAMPLE 8

The purpose of this example is to illustrate the preparation of a homopolymer of acrylic acid according to the invention, and the homopolymer according to the invention thus obtained.
Test no 36
Preparation of compound B of formula (I):

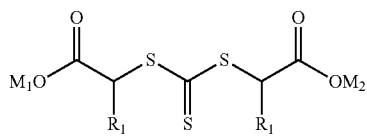

where $R_1$ designates the alkyl radical having 6 carbon atoms;
and $M_1$ and $M_2$ designate the sodium atom Na.
In a beaker being stirred by magnetic means, the following are weighed:
  30.4 grams of water;
  9.9 grams of 2 bromooctanoic acid.

The mixture is neutralised with a 50% soda solution until a pH equal to 6.5 is obtained. The temperature rises to 50° C. A homogeneous solution is then obtained, which is cooled to 40° C.

13.7 grams of an aqueous solution of 25% disodic trithiocarbonate solution is then poured drop by drop during a 20-minute period.

It is left to react for 2 hours, under stirring action. The S alkylation reaction is slightly exothermic and the temperature increases to 43° C., while the pH settles at 11.5.

A yellow paste is obtained containing compound B.

Test no 37

In a 1-liter reactor fitted with a mechanical stirrer and heating of the oil bath type, the following is introduced:

300 grams of water;

100 grams of acrylic acid;

23.53 grams of an aqueous solution at 17.1% (by dry weight of polymer) containing compound B obtained according to test no 36;

0.8 grams of a polymerisation initiator which is 4,4' azobis (4-cyanopentanoic) sold by the company Aldrich™ under the name V501.

Whilst stirring, the mixture is heated to a temperature equal to 100° C. The temperature is then maintained at 95° C. for 2 hours. A clear, slightly orangey solution is then obtained, which is cooled to ambient temperature.

This solution is neutralised with soda until pH=8.5; one then obtains a solution which contains a homopolymer of acrylic acid according to the invention neutralised by sodium, of molecular weight equal to 13240 g/mole, with a polymolecularity index equal to 1.83 and a conversion rate higher than 99% (these latter magnitudes are measured according to the methods previously described).

EXAMPLE 9

The purpose of this example is to illustrate the use according to the invention of homopolymers of acrylic acid according to the invention, as an agent for dispersion of mineral matter which is precipitated calcium carbonate.

This example also illustrates the said aqueous dispersion of mineral matter according to the invention.

For tests no 38 to no 47, one introduces into a 2-liter beaker fitted with a motor activating a stirrer blade of diameter 70 mm:

465 grams of water;

8 grams of homopolymer of acrylic acid according to the invention for testing;

1100 dry grams of a precipitated calcium carbonate sold by the company SOLVAY™ under the name SOCAL™ P3;

The aqueous dispersion obtained is kept at a pH of between 9 and 9.5 through the addition of soda.

For the dispersion thus obtained, its Brookfield™ viscosity is determined at 100 rpm, according to the procedure previously described in the present application.

The corresponding results are shown in table 7.

TABLE 7

Brookfield ™ viscosity measured at 100 rpm for aqueous dispersions of precipitated calcium carbonate according to the invention, obtained through the use according to the invention of homopolymers of acrylic acid according to the invention, as dispersing agents.

| Test n° | Homopolymer of acrylic acid according to the invention, obtained for test n° | Brookfield ™ viscosity at 100 rpm |
|---|---|---|
| 38 | 22 | 26500 |
| 39 | 23 | 26200 |
| 40 | 24 | 19700 |
| 41 | 25 | 12200 |
| 42 | 26 | 9400 |
| 43 | 27 | 6400 |
| 44 | 15 | 4500 |
| 45 | 16 | 4050 |
| 46 | 19 | 2900 |
| 47 | 20 | 2100 |

The results of table 7 show that the homopolymers of acrylic acid according to the invention allow the precipitated calcium carbonate to be dispersed in water. These results thus show that it is possible to obtain aqueous dispersions of precipitated calcium carbonate according to the invention, through the use according to the invention of homopolymers of acrylic acid according to the invention, as a dispersing agent of mineral matter.

Finally, the Brookfield™ viscosities measured at 100 rpm show that the aqueous dispersions of precipitated calcium carbonate according to the invention can be used in aqueous formulations, and notably in aqueous paints.

EXAMPLE 10

The purpose of this example is to illustrate the use according to the invention of a homopolymer of acrylic acid according to the invention, as an agent for dispersion of mineral matter which is precipitated calcium carbonate sold by the company SOLVAY™ under the name SOCAL™ P3.

This example illustrates the influence of the quantity of homopolymer used.

This example also illustrates the said aqueous dispersion of mineral matter according to the invention.

For tests no 48 to no 60, various aqueous dispersions of precipitated calcium carbonate are produced, for variable quantities of a homopolymer of acrylic acid according to the invention (obtained for test no 27), according to the same procedure as the one used during example 9.

For the dispersions obtained, the Brookfield™ viscosity is determined at 100 rpm, according to the procedure previously described in the present application.

The corresponding results are shown in table 8.

TABLE 8

Brookfield ™ viscosity measured at 100 rpm for dispersions of precipitated calcium carbonate according to the invention, obtained through the use of a given quantity (% by dry weight of homopolymer relative to the dry weight of mineral matter) of a homopolymer of acrylic acid according to the invention, as a dispersing agent

| Test n° | % by weight of homopolymer of acrylic acid according to test n°27 | Brookfield ™ viscosity at 100 rpm |
|---|---|---|
| 48 | 0.20 | 6500 |
| 49 | 0.40 | 3625 |
| 50 | 0.41 | 2500 |
| 51 | 0.42 | 1900 |
| 52 | 0.43 | 1540 |
| 53 | 0.44 | 1340 |
| 54 | 0.45 | 1180 |
| 55 | 0.46 | 1040 |
| 56 | 0.49 | 960 |
| 57 | 0.52 | 920 |
| 58 | 0.54 | 890 |
| 59 | 0.57 | 880 |
| 60 | 0.60 | 900 |

The results of table 8 show that the homopolymer of acrylic acid according to the invention allows precipitated calcium carbonate to be dispersed in water. These results thus show that it is possible to obtain aqueous dispersions of precipitated calcium carbonate according to the invention, through the use according to the invention of this homopolymer of acrylic acid, as a dispersing agent of mineral matter.

Finally, the Brookfield™ viscosities measured at 100 rpm show that the aqueous dispersions of precipitated calcium carbonate according to the invention can be used in aqueous formulations, and notably in aqueous paints.

EXAMPLE 11

The purpose of this example is to illustrate the direct use of homopolymers of acrylic acid according to the invention, as a dispersing agent of mineral matter in aqueous paint formulations.

For tests no 61 to no 64, aqueous paint formulations are produced, using techniques well known by the skilled man in the art. The compositions of the said formulations are shown in table 9.

Test no 61
This test illustrates the prior art and uses 0.12% by dry weight relative to the total weight of the aqueous paint formulation, of a dispersing agent based on a homopolymer of acrylic acid, of molecular weight equal to 13000 g/mole and with a polymolecularity index equal to 3.

Test no 62
This test illustrates the invention and uses 0.095% by dry weight of polymer relative to the total weight of the formulation, of the copolymer according to the invention obtained by test no 16.

Test no 63
This test illustrates the invention and uses 0.095% by dry weight of polymer relative to the total weight of the formulation, of the copolymer according to the invention obtained by test no 6.

Test no 64
This test illustrates the invention and uses 0.095% by dry weight of polymer relative to the total weight of the formulation, of the copolymer according to the invention obtained by test no 18.

For each of these formulations, the following are then determined:
- the Brookfield™ viscosities at 10 and 100 rpm, according to the method previously described, and noted respectively $\mu^B_{10}$ (mPa·s) and $\mu^B_{100}$ (mPa·s);
- the ICI™ viscosity using a cone-plane viscometer, known as an ICI™ viscometer, sold by the company ERICHSEN™, the measurement being made at 25° C. and noted $\mu^1$ (mPa·s);
- the Stormer™ viscosity using a Stormer viscometer of the KU-1 type sold by the company Brookfield™, fitted with a single measurement system, the measurement being made at 25° C. and noted $\mu^S$ (K.U).

These viscosity measurements are made at the times t=0 and t=24 hours.

These parameters are shown in table 9.

TABLE 9 composition and viscosities of the various aqueous paints formulated through the direct use of a dispersing agent of the prior art (test n° 61) and through the direct use according to the invention of dispersing agents according to the invention (tests n° 62, 63 and 64).

| | Test n° | 61 | 62 | 63 | 64 |
|---|---|---|---|---|---|
| Constituents of the aqueous paint formulations (masses in grams) | Water | 235 | 234.3 | 234.1 | 234.3 |
| | Ammonia | 2.6 | 2.6 | 2.6 | 2.6 |
| | Acrylic dispersing agent of the prior art | 3 | 0 | 0 | 0 |
| | Polymer according to test n° 16 | 0 | 3.7 | 0 | 0 |
| | Polymer according to test n° 6 | 0 | 0 | 3.9 | 0 |
| | Polymer according to test n° 18 | 0 | 0 | 0 | 3.7 |
| | Mergal ™ K6N | 2 | 2 | 2 | 2 |
| | Byk ™ 34 | 1.4 | 1.4 | 1.4 | 1.4 |
| | TiO2 RL68 | 41 | 41 | 41 | 41 |
| | Durcal ™ 2 | 328 | 328 | 328 | 328 |
| | Hydrocarb ™ | 215 | 215 | 215 | 215 |
| | Rhodopas ™ DS 2800 | 160 | 160 | 160 | 160 |
| | Viscoatex ™ 46 | 12 | 12 | 12 | 12 |

TABLE 9-continued composition and viscosities of the various aqueous paints formulated through the direct use of a dispersing agent of the prior art (test n° 61) and through the direct use according to the invention of dispersing agents according to the invention (tests n° 62, 63 and 64).

| | Test n° | | 61 | 62 | 63 | 64 |
|---|---|---|---|---|---|---|
| Viscosities of aqueous paint formulations | Time t = 0 | $\mu^B_{10}$ | 15000 | 15200 | 15300 | 16000 |
| | | $\mu^B_{100}$ | 2780 | 3000 | 2910 | 3040 |
| | | $\mu^I$ | 1.2 | 1.3 | 1.2 | 1.2 |
| | | $\mu^S$ | 98 | 100 | 100 | 100 |
| | Time t = 24 hours | $\mu^B_{10}$ | 11300 | 11400 | 10600 | 11400 |
| | | $\mu^B_{100}$ | 2450 | 2620 | 2480 | 2600 |
| | | $\mu^I$ | 1.4 | 1.4 | 1.4 | 1.4 |
| | | $\mu^S$ | 95 | 95 | 95 | 96 |

Acrylic dispersing agent of the prior art designates a dispersing agent of the prior art based on a homopolymer of acrylic acid, of molecular weight equal to 13000 g/mole and with a polymolecularity index equal to 3.

Mergal™ K6N is a bactericide sold by the company TROY™.

Byk™ 34 is an anti-foaming agent sold by the company BYK™.

TiO2 RL68 is titanium dioxide sold by the company DUPONT™.

Durcal™ 2 is a calcium carbonate sold by the company OMYA™.

Hydrocarb™ is a calcium carbonate suspension sold by the company OMYA™.

Rhodopas™ DS 2800 is an aqueous solution (28% by dry weight of polymer relative to the total weight of the solution) of acrylic styrene binder sold by the company RHODIA™.

Viscoatex™ 46 is an acrylic thickener sold by the company COATEX™.

$\mu^B 10$ (mPa·s) and $\beta^B_{100}$ (mPa·s) designate respectively the Brookfield™ viscosities measured at 10 and 100 rpm.

$\mu^I$ (mPa·s) designates the ICI™ viscosity.

$\mu^S$ (K.U) designates the Stormer™ viscosity.

The results of table 9 show that the polymers according to the invention enable aqueous paints according to the invention to be obtained, having viscosities similar to the paint formulated with a dispersing agent of the prior art, although they contain a smaller proportion of dispersing agent (0.095% for the invention, compared to 0.120% for the prior art, expressed as the dry weight of polymer relative to the total weight of the paint formulation): consequently, these results show that the polymers according to the invention are more effective dispersing agents than those of the prior art, when they are used as direct additives in an aqueous paint formulation.

EXAMPLE 12

The purpose of this example is to illustrate the direct use according to the invention of copolymers of acrylic acid with water-soluble monomers, as dispersing agents in cement mortar formulations.

This example also illustrates the mortars according to the invention thus obtained.

Test no 65

This test illustrates the prior art.

A mortar formulation is produced using 450 grams of cement 42.5 R CEM I Gaurain, 1350 grams of standardised sand ISO 679 and 191 grams of water.

This mortar gives a slump on the impact table (20 blows) of:
12 cm at time T=0;
10.5 cm at time T=30 minutes;
10 cm at time T=60 minutes.

Test no 66

This test illustrates the invention.

A mortar formulation is produced using 450 grams of cement 42.5 R CEM I Gaurain, 1350 grams of standardised sand ISO 679 and 191 grams of water, and 2.6 grams of the polymer according to the invention obtained for test no 34.

This mortar gives a slump on the impact table (20 blows) of:
21.5 cm at time T=0;
19.6 cm at time T=30 minutes;
19.2 cm at time T=60 minutes.

These results show that the polymer according to the invention allows not only the cement composition to be liquefied, but also enables this fluidity to be maintained over time: it thus acts as an effective dispersing agent and as a direct additive in a cement mortar formulation.

Test no 67

This test illustrates the prior art.

A mortar formulation is produced using 450 grams of cement 42.5 R CEM I Gaurain, 1590 grams of standardised sand ISO 679 and 248 grams of water.

This mortar gives a slump on the impact table (20 blows) of 20 cm at time T=0.

Test no 68

This test illustrates the invention.

A mortar formulation is produced using 450 grams of cement 42.5 R CEM I Gaurain, 1731 grams of standardised sand ISO 679 and 212 grams of water, together with 2.12 grams of the polymer according to the invention obtained for test no 34.

These results show that the polymer according to the invention enables the quantity of water to be reduced substantially whilst increasing the quantity of sand. It thus acts as an effective dispersing agent and as a direct additive in a mortar formulation.

In addition, the reduction of the quantity of water and the increase of the quantity of sand lead to a significant increase of the mechanical resistance of the cement composition according to the invention.

EXAMPLE 13

The purpose of this example is to illustrate the direct use according to the invention of copolymers of acrylic acid with water-soluble monomers, as dispersing agents in cement plaster formulations.

This example also illustrates the plasters according to the invention thus obtained.

Test no 69

This test illustrates the prior art.

A plaster formulation is produced from 179.3 grams of plaster of Paris and 110 grams of water.

This formulation has a slump measured using the Schmidt ring equal to 17.6 cm.

Test no 70

This test illustrates the invention.

A plaster formulation is produced from 179.3 grams of plaster of Paris, 110 grams of water and 0.51 grams of the polymer according to the invention obtained for test no 34.

This formulation has a slump measured using the Schmidt ring equal to 26 cm.

These results show that the use of the polymer according to the invention enables the fluidity of the plaster-based formulation to be increased substantially: the polymer according to the invention thus acts as an effective dispersing agent as a direct additive in a plaster formulation.

Test no 71

This test illustrates the invention.

A plaster formulation is produced using the same raw materials as in test no 69, but reducing the quantity of water used and adjusting the quantity of polymer so as to obtain a slump identical to the previous test.

To do so, one uses 179.3 grams of plaster of Paris, 73 grams of water, and 2.56 grams of the polymer according to test no 34.

The slump of this plaster-based formulation is identical to that obtained for test no 69 (17.6 cm) but the quantity of water is greatly reduced (−33.6%) in the plaster composition according to the invention.

The resulting plaster contains substantially less water which, in the case of its use for the manufacture of gypsum boards or tiles, allows a substantial energy economy during drying.

These results thus show that the polymer according to the invention acts as an effective dispersing agent as a direct additive in a plaster formulation.

In addition, the deflection and compression resistance of the resulting products (tiles, boards, etc.) is substantially increased through the reduction of the porosity created by the surplus water.

EXAMPLE 14

The purpose of this example is to illustrate the use according to the invention of copolymers of acrylic acid with water-soluble monomers, as grinding agents of mineral matter.

This example also illustrates the use of the said suspensions of mineral matter in the formulation of ceramics.

Test no 72

This test illustrates the prior art.

A formulation of clays, sand and feldspar is ground using a wet method in order to obtain a fine suspension able to be used without further process to manufacture ceramic parts (sinks and sanitary units) or dried by atomisation to obtain a powder which can subsequently be pressed in order to manufacture ceramic tiles.

The said formulation contains 200 grams of a mixture of clay, feldspar and sand, and 94 grams of water. It is ground using a high-speed planetary mill containing 300 grams of beads, for 13 minutes.

The formulation cannot be extracted from the mill.

Test no 73

This test illustrates the invention.

A formulation of clays, sand and feldspar is ground using a wet method in order to obtain a fine suspension able to be used without further process to manufacture ceramic parts (sinks and sanitary units) or dried by atomisation to obtain a powder which can subsequently be pressed in order to manufacture ceramic tiles.

The said formulation contains 200 grams of a mixture of clay, feldspar and sand, 94 grams of water, and 0.8 grams of a mixture of 80% by weight of sodium silicate and 20% by weight of the invention obtained in test no 27. It is ground using a high-speed planetary mill containing 300 grams of beads, for 13 minutes.

The ground dispersion has a viscosity measured using Ford cup N° 4 of 19.5 seconds.

These results show that the polymer according to the invention is an effective grinding agent for aqueous suspensions of mineral matter able to be used in ceramics.

EXAMPLE 14

The purpose of this example is to illustrate the use according to the invention of a homopolymer of acrylic acid, as scale inhibitor agent in a composition for water treatment. This example also illustrates the composition for treatment of the water thus obtained.

Test no 74

This test illustrates the prior art.

A mass of 500 grams of natural water having an alkaline earth salt content of 300 mg/l expressed as calcium carbonate is placed in a glass balloon fitted with a vertical cooler. This water is refluxed and samples are taken, filtered at 0.45 micrometers and dosed with free calcium at the start of boiling, after 15 minutes and after 30 minutes. The residual hardness of the water is then measured (by complexometry) at these 3 time points.

Test no 75

This test illustrates the invention.

A mass of 500 grams of natural water having an alkaline earth salt content of 300 mg/l expressed as calcium carbonate containing 5 mg/l of the polymer according to the invention obtained for test no 13 added to it, is placed in a glass balloon fitted with a vertical cooler. This water is refluxed and samples are taken, filtered at 0.45 micrometers and dosed with free calcium at the start of boiling, after 15 minutes and after 30 minutes. The residual hardness of the water is then measured (by complexometry) at these 3 time points.

The results of the water's residual hardness obtained for tests no 74 and no 75 are shown in table 10.

TABLE 10 residual hardness measured for compositions for water treatment.

| Test n° | Residual hardness at T = 0 | Residual hardness at T = 15 min | Residual hardness at T = 30 min |
|---|---|---|---|
| 75 | 300 ppm | 213 ppm | 165 ppm |
| 74 | 300 ppm | 120 ppm | 90 ppm |

These results show that the polymer according to the invention enables a substantial residual hardness to be maintained, avoiding by this means the deposit of scale on the walls.

The invention claimed is:

1. A method of grinding and/or co-grinding mineral matter, the method comprising grinding and/or co-grinding the mineral matter in the presence of a homopolymer of acrylic acid and/or copolymer of acrylic acid with a hydrosoluble monomer, wherein the homopolymer and/or copolymer has a polymolecularity index of under 2.2 determined in an aqueous media by a gel permeation chromatographic (GPC) method, having as a standard a series of 5 sodium polyacrylate standards suppled by Polymer Standard Service a references PAA 18K, PAA 8K, PAA 5K, PAA 4K and PAA 3K, and the homopolymer and/or copolymer comprises at an end of the homopolymer and/or copolymer chain a pattern in accordance with the following formula (I):

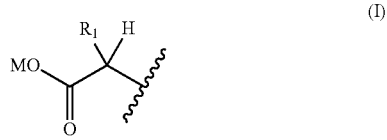

(I)

wherein
$R_1$ is an alkyl radical having 1 to 10 carbon atoms or an aromatic radical that is optionally substituted by an alkyl chain having 1 to 4 carbon atoms; and
M is a hydrogen atom, an amine salt, ammonium or an alkaline cation.

2. The method of claim 1, wherein in the method, in formula (I), M is an amine salt, and wherein the amine in the amine salt is an aliphatic and/or cyclic primary, secondary, or tertiary amine.

3. The method of claim 1, wherein in the method, the mineral matter is selected from the group consisting of a natural calcium carbonate, a synthetic calcium carbonate, a dolomite, kaolin, talc, gypsum, titanium oxide, satin white, aluminium trihydroxide, mica, natural fibres, and mixtures thereof.

4. The method of claim 1, wherein in the method, the mineral matter is selected from the group consisting of marble, calcite, chalk, and mixtures thereof.

5. The method of claim 1, wherein in the method, 0.05% to 5% by dry weight of the homopolymer of acrylic acid and/or copolymer of acrylic acid with a hydrosoluble monomer is employed, relative to a dry weight of mineral matter.

6. The method of claim 1, wherein in the method, 0.1% to 3% by dry weight of the homopolymer of acrylic acid and/or copolymer of acrylic acid with a hydrosoluble monomer is employed, relative to the dry weight of mineral matter.

7. A method of dispersing mineral mater in a solution, the method comprising dispersing the mineral matter with a homopolymer of acrylic acid and/or copolymer of acrylic acid with a hydrosoluble monomer, wherein the homopolymer and/or copolymer has a polymolecularity index of under 2.2 determined in an aqueous media by a gel permeation chromatographic (GPC) method, having as a standard a series of 5 sodium polyacrylate standards suppled by Polymer Standard Service a references PAA 18K, PAA 8K, PAA 5K, PAA 4K and PAA 3K, and the homopolymer and/or copolymer comprises at an end of the homopolymer and/or copolymer chain a pattern in accordance with the following formula (I):

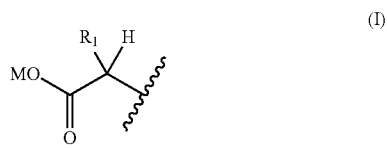

(I)

wherein
$R_1$ is an alkyl radical having 1 to 10 carbon atoms or an aromatic radical that is optionally substituted by an alkyl chain having 1 to 4 carbon atoms; and M is a hydrogen atom, an amine salt, ammonium or an alkaline cation.

8. The method of claim 7, wherein in the method, the mineral matter is selected from the group consisting of a natural calcium carbonate, a synthetic calcium carbonate, a dolomite, kaolin, talc, gypsum, titanium oxide, satin white, aluminium trihydroxide, mica, natural fibres, and mixtures thereof.

9. The method of claim 7, wherein the method, the mineral matter is selected from the group consisting of marble, calcite, chalk, and mixtures thereof.

10. The method of claim 7, wherein in the method, 0.05% to 5% by dry weight of the homopolymer of acrylic acid and/or copolymer of acrylic acid with a hydrosoluble monomer is employed, relative to a dry weight of mineral matter.

11. The method of claim 7, wherein in the method, 0.1% to 3% by dry weight of the homopolymer of acrylic acid and/or copolymer of acrylic acid with a hydrosoluble monomer is employed, relative to a dry weight of mineral matter.

12. An aqueous suspension comprising ground mineral matter, wherein the ground mineral matter is produced by grinding mineral matter in the presence of a homopolymer of acrylic acid and/or copolymer of acrylic acid with a hydrosoluble monomer, wherein the homopolymer and/or copolymer has a polymolecularity index of under 2.2 determined in an aqueous media by a gel permeation chromatographic (GPC) method, having as a standard a series of 5 sodium polyacrylate standards suppled by Polymer Standard Service a references PAA 18K, PAA 8K, PAA 5K, PAA 4K and PAA 3K, and the homopolymer and/or copolymer comprises at an end of the homopolymer and/or copolymer chain a pattern in accordance with the following formula (I):

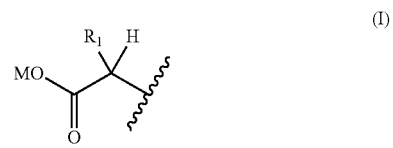

(I)

wherein
$R_1$ is an alkyl radical having 1 to 10 carbon atoms or an aromatic radical that is optionally substituted by an alkyl chain having 1 to 4 carbon atoms; and
M is a hydrogen atom, an amine salt, ammonium or an alkaline cation; and
wherein the ground mineral matter comprises a material selected from the group consisting of a calcium carbonate, a dolomite, kaolin, talc, gypsum, titanium oxide, satin white, aluminium trihydroxide, mica, natural fibres, and mixtures thereof.

13. The aqueous suspension of claim 12, wherein the ground mineral matter comprises the calcium carbonate, and wherein the calcium carbonate is selected from the group consisting of marble, calcite, chalk, and mixtures thereof.

14. The aqueous suspension of claim 12 comprising the ground mineral matter, wherein the ground mineral matter is produced by grinding the mineral matter in the presence of 0.05% to 5% by dry weight of the homopolymer of acrylic acid and/or copolymer of acrylic acid with a hydrosoluble monomer, relative to a dry weight of the ground mineral matter.

15. The aqueous suspension of claim 12 comprising the ground mineral matter, wherein the ground mineral matter is produced by grinding the mineral matter in the presence of 0.1% to 3% by dry weight of the homopolymer of acrylic acid and/or copolymer of acrylic acid with a hydrosoluble monomer, relative to a dry weight of the ground mineral matter.

16. The aqueous suspension of claim 12, wherein the ground mineral matter comprises the calcium carbonate, and the calcium carbonate is a natural calcium carbonate.

17. The aqueous suspension of claim 12, wherein ground mineral matter comprises the calcium carbonate, and the calcium carbonate is a synthetic calcium carbonate.

18. The aqueous suspension of claim 12, comprising 0.05% to 5% by dry weight of the homopolymer of acrylic acid and/or copolymer of acrylic acid with a hydrosoluble monomer, relative to the dry weight of ground mineral matter.

19. The aqueous suspension of claim 12, comprising 0.1% to 3% by dry weight of the homopolymer of acrylic acid and/or copolymer of acrylic acid with a hydrosoluble monomer, relative to the dry weight of ground mineral matter.

20. A paper formulation coating comprising the aqueous suspension of claim 12.

21. A paint comprising the aqueous suspension of claim 12.

22. A plastics formulation comprising the aqueous suspension of claim 12.

23. A cement formulation comprising the aqueous suspension of claim 12.

24. A ceramic formulation comprising the aqueous suspension of claim 12.

25. A detergent formulation comprising the aqueous suspension of claim 12.

26. A water treatment formulation comprising the aqueous suspension of claim 12.

27. A drilling mud comprising the aqueous suspension of claim 12.

28. A cosmetic formulation comprising the aqueous suspension of claim 12.

29. A method of forming a formulation, the method comprising forming the formulation with a homopolymer of acrylic acid and/or copolymer of acrylic acid with a hydrosoluble monomer, wherein the homopolymer and/or copolymer has a polymolecularity index of under 2.2 determined in an aqueous media by a gel permeation chromatographic (GPC) method, having as a standard a series of 5 sodium polyacrylate standards suppled by Polymer Standard Service a references PAA 18K, PAA 8K, PAA 5K, PAA 4K and PAA 3K, and the homopolymer and/or copolymer comprises at an end of the homopolymer and/or copolymer chain a pattern in accordance with the following formula (I):

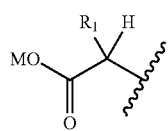

(I)

wherein
$R_1$ is an alkyl radical having 1 to 10 carbon atoms or an aromatic radical that is optionally substituted by an alkyl chain having 1 to 4 carbon atoms; and
M is a hydrogen atom, an amine salt, ammonium or an alkaline cation.

30. The method of claim 29, wherein the formulation is a paper formulation.

31. The method of claim 29, wherein the formulation is a paint formulation.

32. The method of claim 29, wherein the formulation is a ceramic formulation.

33. The method of claim 29, wherein the formulation is a water treatment formulation.

34. The method of claim 29, wherein the formulation is a detergent formulation.

35. The method of claim 29, wherein the formulation is a drilling mud.

36. The method of claim 29, wherein the formulation is a cosmetic formulation.

37. The method of claim 29, wherein the formulation is water treatment formulation.

38. A formulation comprising a homopolymer of acrylic acid and/or copolymer of acrylic acid with a hydrosoluble monomer, wherein the homopolymer and/or copolymer has a polymolecularity index of under 2.2 determined in an aqueous media by a gel permeation chromatographic (GPC) method, having as a standard a series of 5 sodium polyacrylate standards suppled by Polymer Standard Service a references PAA 18K, PAA 8K, PAA 5K, PAA 4K and PAA 3K, and the homopolymer and/or copolymer comprises at an end of the homopolymer and/or copolymer chain a pattern in accordance with the following formula (I):

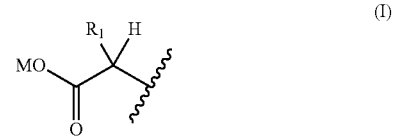

(I)

wherein
$R_1$ is an alkyl radical having 1 to 10 carbon atoms or an aromatic radical that is optionally substituted by an alkyl chain having 1 to 4 carbon atoms; and
M is a hydrogen atom, an amine salt, ammonium or an alkaline cation.

39. A paper formulation comprising the formulation of claim 38.

40. A paint comprising the formulation of claim 38.

41. A plastic formulation comprising the formulation of claim 38.

42. A cement formulation comprising the formulation of claim 38.

43. A ceramic formulation comprising the formulation of claim 38.

44. A water treatment formulation comprising the formulation of claim 38.

45. A detergent comprising the formulation of claim 38.

46. A drilling mud comprising the formulation of claim 38.

47. A cosmetic formulation comprising the formulation of claim 38.

* * * * *

UNITED STATES PATENT AND TRADEMARK OFFICE
CERTIFICATE OF CORRECTION

PATENT NO.        : 8,053,497 B2
APPLICATION NO.   : 12/909661
DATED             : November 8, 2011
INVENTOR(S)       : Jean-Marc Suau et al.

It is certified that error appears in the above-identified patent and that said Letters Patent is hereby corrected as shown below:

Column 8, line 55, "4 carbon atoms" should read --2 to 4 carbon atoms--;
        line 58, "4" should read --2 to 4--;
    Column 12, line 48, "Test no 2" should read --Test n°2--;
    Column 13, line 8, "Test no 3" should read --Test n°3--;
        line 39, "Test no 4" should read --Test n°4--;
        line 44, "no 1" should read --n°1--;
        line 58, "Test no 5" should read --n°5--;
        line 63, "no 1" should read --n°1--;
    Column 14, line 8, "Test no 6" should read --Test n°6--;
        line 13, "no 1" should read --n°1--;
        line 25, "Test no 7" should read --Test n°7--;
        line 30, "no 1" should read --n°1--;
        line 43, "tests no 2 to 7" should read --tests n°2 to 7--;
    Column 15, line 14, "Tests no 2 to 7" should read --Tests n°2 to 7--;
    Column 16, line 11, "this" should read --This--;
        line 14, "Test no 8" should read --Test n°8--;
        line 24, "Test no 9" should read --Test n°9--;
        line 36, "Test no 10" should read --Test n°10--;
        line 56, "Test no 11" should read --Test n°11--;
        line 59, "test no 4" should read --test n°4--;
        line 60, "Test no 12" should read --Test n°12--;
        line 62, "no 3" should read --n°3--;
    Column 17, line 42, "tests no 13 to no 21" should read --tests n°13 to n°21--;
    Column 18, line 24, "test no 1" should read --test n°1--;
    Column 19, line 18, "tests no 22 to no 27" should read --tests n°22 to n°27--;
        line 22, "test no 1" should read --test n°1--;
    Column 20, line 34, "tests no 28 to no 32" should read --tests n°28 to n°32--;
        line 38, "test no 1" should read --test n°1--;
        line 39, "± 2°C.," should read --±2°C,--;

Signed and Sealed this
Twentieth Day of March, 2012

David J. Kappos
*Director of the United States Patent and Trademark Office*

CERTIFICATE OF CORRECTION (continued)

U.S. Pat. No. 8,053,497 B2

Column 21, line 40, "no 33 to no 35" should read --n°33 to n°35--;
    line 48, "no 1" should read --n°1--;
    line 48, "tests no 33 to no 35" should read --tests n°33 to n°35--;
    line 52, "70°C.," should read --70°C,--;
Column 22, line 52, "Test no 36" should read --Test n°36--;
Column 23, line 10, "43°C.," should read --43°C,--;
    line 12, "Test no 37" should read --Test n°37--;
    line 19, "test no 36" should read --test n°36--;
    line 50, "tests no 38 to no 47" should read --tests n°38 to n°47--;
Column 24, line 57, "tests no 48 to no 60" should read --tests n°48 to n°60--;
    line 60, "test no 27" should read --test n°27--;
Column 26, line 1, "tests no 61 to no 64" should read --tests n°61 to n°64--;
    line 5, "Test no 61" should read --Test n°61--;
    line 11, "Test no 62" should read --Test n°62--;
    line 15, "test no 16" should read --test n°16--;
    line 16, "Test no 63" should read --Test n°63--;
    line 19, "test no 6" should read --test n°6--;
    line 20, "Test no 64" should read --Test n°64--;
    line 24, "test no 18" should read --test n°18--;
Column 27, line 37, "$\beta^B_{100}$" should read --$\mu^B_{100}$--;
    line 63, "Test no 65" should read --Test n°65--;
Column 28, line 22, "Test no 66" should read --Test n°66--;
    line 27, "test no 34" should read --test n°34--;
    line 38, "Test no 67" should read --Test n°67--;
    line 45, "Test no 68" should read --Test n°68--;
    line 51, "test no 34" should read --test n°34--;
Column 29, line 3, "Test no 69" should read --Test n°69--;
    line 9, "Test no 70" should read --Test n°70--;
    line 13, "test no 34" should read --test n°34--;
    line 21, "Test no 71" should read --Test n°71--;
    line 23, "test no 69" should read --test n°69--;
    line 27, "test no 34" should read --test n°34--;
    line 30, "test no 69" should read --test n°69--;
    line 53, "Test no 72" should read --Test n°72--;
    line 66, "Test no 73" should read --Test n°73--;
Column 30, line 10, "test no 27" should read --test n°27--;
    line 26, "Test no 74" should read --Test n°74--;
    line 36, "Test no 75" should read --Test n°75--;
    line 41, "test no 13" should read --test n°13--;
    line 48, "tests no 74 and no 75" should read --tests n°74 and n°75--;
Column 31, line 4, "suppled" should read --supplied--;
    line 44, "mater" should read --matter--;
    line 51, "suppled" should read --supplied--;

CERTIFICATE OF CORRECTION (continued)
U.S. Pat. No. 8,053,497 B2

Column 32, line 28, "suppled" should read --supplied--;
Column 33, line 42, "suppled" should read --supplied--;
Column 34, line 25, "suppled" should read --supplied--;